United States Patent
Su et al.

(10) Patent No.: US 9,949,235 B2
(45) Date of Patent: Apr. 17, 2018

(54) WIRELESS PAGING MODE FOR LOW-POWER OPERATION

(71) Applicant: Atmosic Technologies Inc., Saratoga, CA (US)

(72) Inventors: David Su, Saratoga, CA (US); Manolis Terrovitis, Athens (GR); Masoud Zargari, Irvine, CA (US)

(73) Assignee: Atmosic Technologies Inc., Saratoga, CA (US)

(*) Notice: Subject to any disclaimer, the term of this patent is extended or adjusted under 35 U.S.C. 154(b) by 0 days.

(21) Appl. No.: 15/640,851

(22) Filed: Jul. 3, 2017

(65) Prior Publication Data

US 2018/0014273 A1     Jan. 11, 2018

Related U.S. Application Data

(60) Provisional application No. 62/360,002, filed on Jul. 8, 2016.

(51) Int. Cl.
| | |
|---|---|
| *H04W 68/00* | (2009.01) |
| *H04W 68/02* | (2009.01) |
| *H04W 4/00* | (2018.01) |
| *H04W 52/02* | (2009.01) |
| *H04L 5/00* | (2006.01) |
| *H04W 88/02* | (2009.01) |

(52) U.S. Cl.
CPC .......... *H04W 68/02* (2013.01); *H04L 5/0055* (2013.01); *H04W 4/008* (2013.01); *H04W 52/0235* (2013.01); *H04W 88/02* (2013.01)

(58) Field of Classification Search
CPC ...................................................... H04W 68/02
USPC ......................................... 455/458, 573, 574
See application file for complete search history.

(56) References Cited

U.S. PATENT DOCUMENTS

| | | | | |
|---|---|---|---|---|
| 6,323,775 | B1 * | 11/2001 | Hansson | ............... H02J 7/0047 |
| | | | | 235/384 |
| 2009/0017843 | A1 * | 1/2009 | Laroia | ................. H04W 76/023 |
| | | | | 455/458 |

* cited by examiner

*Primary Examiner* — Joel Ajayi
(74) *Attorney, Agent, or Firm* — Paradice and Li LLP (57) ABSTRACT

Method and apparatus for generating and receiving a paging signal are provided. The paging signal may be received by a wireless device in a low-power state. The paging signal may include a target identification (ID) that may be associated with the wireless device. If the target ID is associated with the wireless device, the wireless device may leave the low-power state, enter an active power state and communicate with other wireless devices. The wireless device may include power harvesting circuitry to convert RF energy from the paging signal into power to operate a portion of the wireless device.

30 Claims, 5 Drawing Sheets

WIRELESS PAGING MODE FOR LOW-POWER OPERATION

CROSS REFERENCE TO RELATED APPLICATION

This application claims the benefit of commonly owned U.S. Provisional Patent Application No. 62/360,002 entitled "WIRELESS PAGING MODE FOR LOW-POWER OPERATION" filed on Jul. 8, 2016, the entirety of which is hereby incorporated by reference.

TECHNICAL FIELD

The present embodiments relate generally to wireless communications, and specifically to wireless paging operations for portable wireless communication devices.

BACKGROUND OF RELATED ART

Wireless communication devices are often battery powered to provide mobility and convenience. Reducing the power consumption of wireless communication devices may extend battery life and thereby increase the time between battery recharging or replacement. Some operations may negatively impact the battery life of a wireless device such as, for example, receiving and processing wireless communication signals that are not addressed to or intended for the wireless device. For example, a wireless device may be in an area where there is a large amount of wireless communication traffic that is not intended for the wireless device. Because the wireless device actively receives and processes these wireless signals to determine which (if any) of the wireless signals are addressed to the wireless device, a significant amount of power may be unnecessarily consumed by the wireless device.

Thus, there is a need to selectively communicate with wireless communication devices in an energy efficient manner.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

An apparatus and method are disclosed that may allow a wireless device to respond to a paging signal. A method of operating a wireless device is disclosed and may include receiving an on-off keying coded radio frequency signal, determining a target identification number from the on-off keying coded radio frequency signal, and operating the wireless device in response to determination that the target ID is associated with the wireless device.

In another example, a wireless device is disclosed and may include an antenna, a paging receiver coupled to the antenna and configured to receive an on-off keying coded radio frequency signal and determine a target identification number from the on-off coded radio frequency signal. The wireless device may also include a controller coupled to the paging receiver and configured to operate the wireless device in response to a determination that the target ID is associated with the wireless device.

In another example, a wireless device may include a means for receiving an on-off keying coded radio frequency signal, a means for determining a target identification from the on-off keying coded RF signal, and a means for operating the wireless device in response to a determination that the target ID is associated with the wireless device.

BRIEF DESCRIPTION OF THE DRAWINGS

The example embodiments are illustrated by way of example and are not intended to be limited by the figures of the accompanying drawings. Like numbers reference like elements throughout the drawings and specification.

DETAILED DESCRIPTION

In the following description, numerous specific details are set forth such as examples of specific components, circuits, and processes to provide a thorough understanding of the disclosure. The term "coupled" as used herein means coupled directly to or coupled through one or more intervening components or circuits. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described below. The non-transitory computer-readable storage medium may form part of a computer program product, which may include packaging materials.

The non-transitory computer-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a computer-readable communication medium that carries or communicates code in the form of instructions or data structures and that may be accessed, read, and/or executed by a computer or other processor.

The various illustrative logical blocks, modules, circuits and instructions described in connection with the implementations disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general-purpose processor may be a microprocessor, but in the alternative, the processor may be any conventional processor, controller, microcontroller, or state machine. A processor may also be implemented as a combination of computing devices (such as a combination of a DSP and a microprocessor), a plurality of microprocessors, one or more microprocessors in conjunction with a DSP core, or any other suitable configuration.

Figure 1:
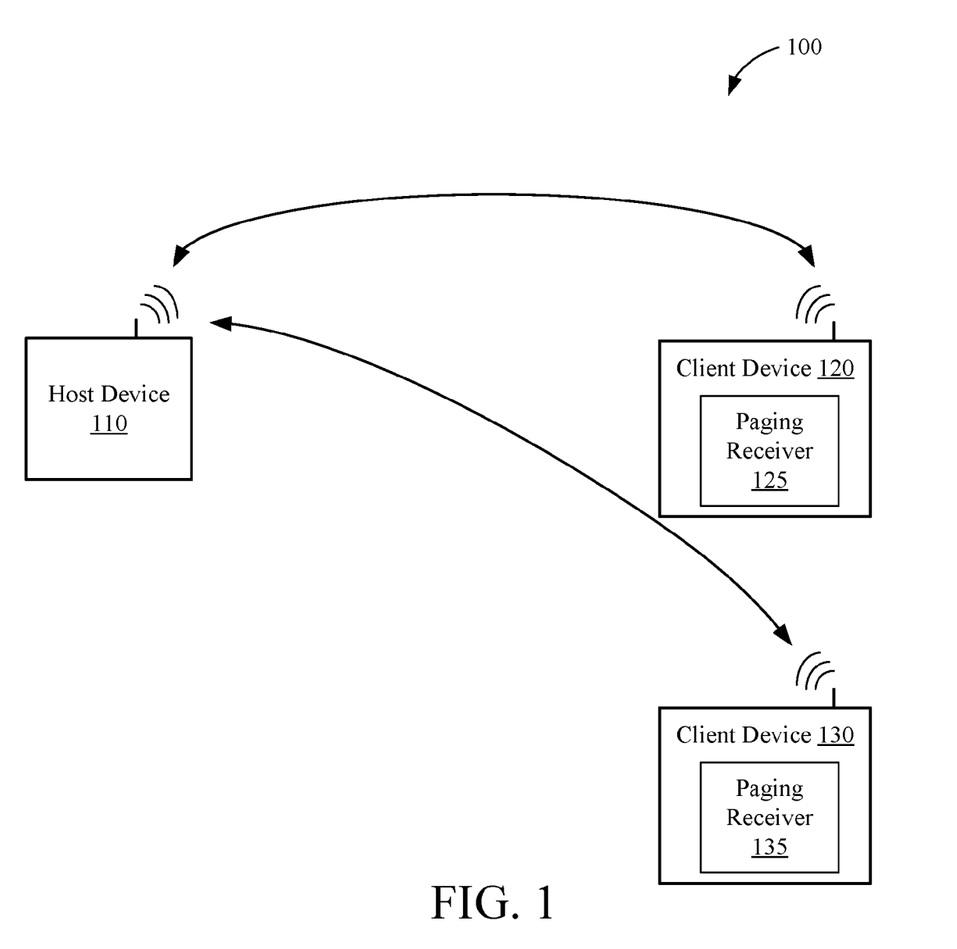
FIG. 1 depicts a wireless communication system within which example embodiments may be implemented.

FIG. 1 depicts a wireless communication system 100 within which example embodiments may be implemented. The wireless communication system 100 may include one or more wireless communication devices such as a host device 110 and client devices 120 and 130. The host device 110 and the client devices 120 and 130 may be any suitable wireless communication device. Example wireless communication devices may include a cell phone, personal digital assistant (PDA), tablet device, laptop computer, or the like. The host device 110 and the client devices 120 and 130 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

For ease of explanation and clarity, the wireless communication system 100 depicts a single host device 110 and two client devices 120 and 130. In other embodiments, the wireless communication system 100 may include any technically feasible number of host devices and/or client devices. The host device 110 and the client devices 120 and 130 may communicate with each other via one or more technically feasible wireless communication protocols. For example, the host device 110 and the client devices 120 and 130 may communicate via Wi-Fi, Bluetooth®, Bluetooth Low Energy (BLE), LTE, or any other suitable communication protocol.

In some embodiments, the client devices 120 and 130 may be battery powered devices that can operate in either a low-power state (also referred to as a reduced power state) or an active power state. In the low-power state, operations of one or more portions of the client devices 120 and 130 may be suspended and/or one or more circuits and components of the client devices 120 and 130 may be powered down to reduce power consumption. In the active power state, portions of the client devices 120 and 130 that were powered down in the low-power state may be powered on, for example, so that the client devices 120 and 130 are fully operational. For example, in some implementations, one or more transceivers and associated circuitry (such as Wi-Fi transceivers, Bluetooth transceivers, and their associated baseband processors and front-end circuits) of the client devices 120 and 130 may be powered down during the low-power state to reduce power consumption, and may be powered on during the active power state to allow for the exchange of data with one or more other wireless devices.

In some implementations, the host device 110 may transmit a paging signal that triggers the client devices 120 and 130 to transition from the low-power state to the active power state. The paging signal may be received by paging receivers 125 and 135 provided within the client devices 120 and 130, respectively. In response to receiving the paging signal, the paging receivers 125 and 135 may cause the associated client devices 120 and 130 to transition from the low-power state to the active power state. As mentioned above, the active power state may be a normal power state that allows client devices 120 and/or 130 to communicate with each other, to communicate with other wireless devices, and to perform a number of user-selected operations.

In some aspects, the paging receivers 125 and 135 may be specialized radio-frequency (RF) receivers that consume only a fraction of the power normally consumed by client devices 120 and 130 (such as during the active power state). The paging receivers 125 and 135 may determine whether a received paging signal identifies or addresses its associated client device, and in response thereto may selectively transition its associated client device from the low-power state to the active power state. For example, if the paging signal identifies or addresses the client device 120, then the paging receiver 125 may generate a "wake" signal that causes the client device 120 to transition from the low-power state to the active power state. Conversely, if the paging signal does not identify or address the client device 120, then the paging receiver 125 may not generate the wake signal and may allow the client device 120 to remain in the low-power state.

In some aspects, the paging signal and the paging receivers 125 and 135 may operate in frequencies bands that may be shared with other transceivers (not shown in FIG. 1 for simplicity) provided within the client devices 120 and 130, respectively. For one example, the client devices 120 and 130 may include one or more Wi-Fi and/or Bluetooth transceivers that operate within the 2.4 GHz industrial, scientific, and medical (ISM) band, the 5 GHz ISM band, and/or the 60 GHz band. For another example, the client devices 120 and 130 may include one or more cellular transceivers that operate within various frequency bands (some of which may overlap frequency bands used by the one or more Wi-Fi and/or Bluetooth transceivers). Thus, the paging signal and the paging receivers 125 and 135 may share the ISM band with other transceivers of the respective client devices 120 and 130.

In some implementations, the paging signal may not be associated with any commercially available communication protocol (such as Wi-Fi and Bluetooth communication protocols), but instead may be based on a signaling technique independent of such commercially available communication protocols. In some aspects, the paging signal may be transmitted on frequencies used by one or more commercially available communication protocols. In other aspects, the paging signal may be transmitted on frequencies distinct from the frequency bands used by commercially available communication protocols. One embodiment of a paging signal is described in more detail below in conjunction with FIG. 2.

Figure 2:
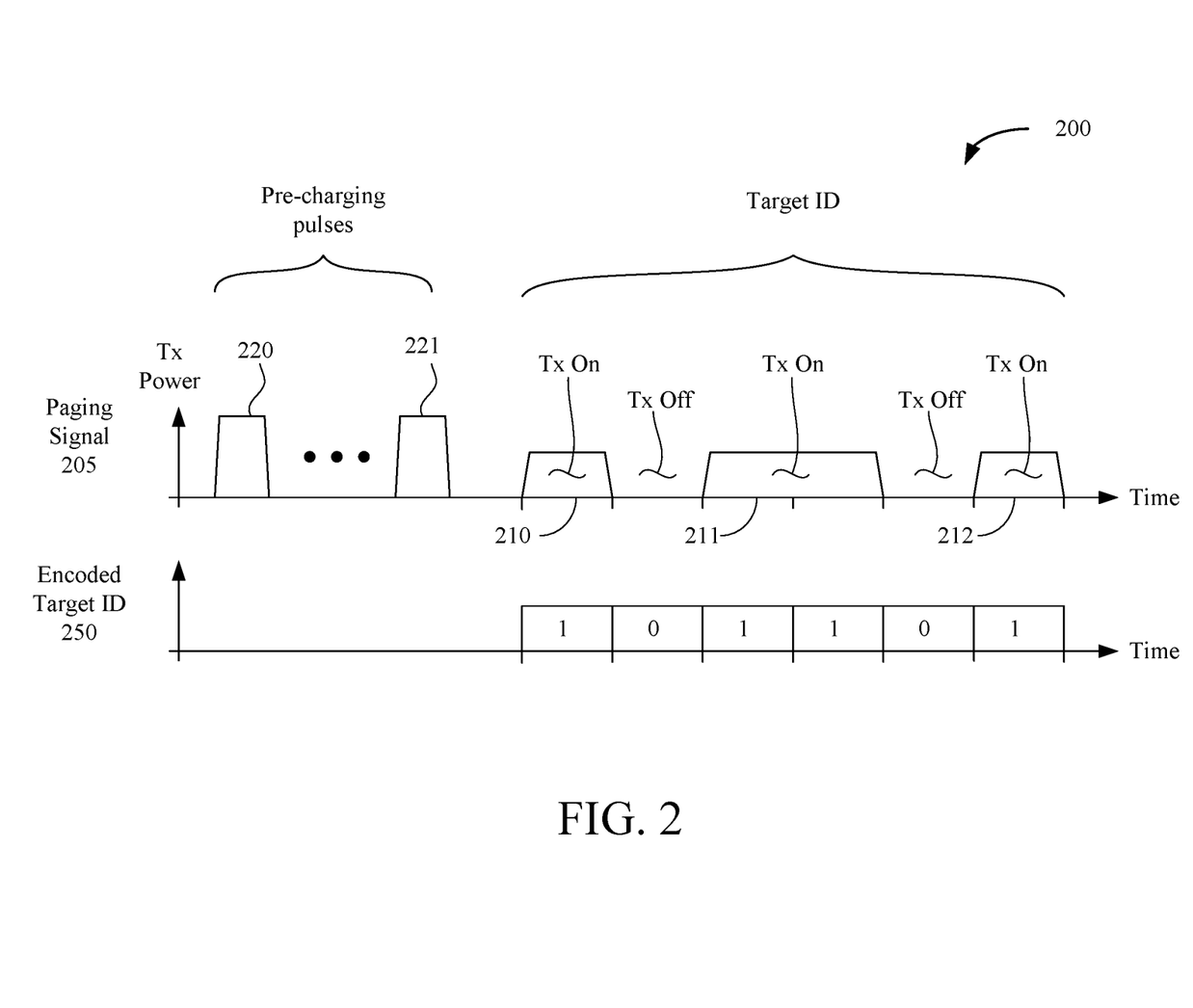
FIG. 2 is a diagram depicting one embodiment of a paging signal that may be transmitted by a host device.

FIG. 2 is a diagram 200 depicting one embodiment of a paging signal 205 that may be transmitted by the host device 110 to the client devices 120 and 130 of FIG. 1. The paging signal 205 may include one or more encoded target identification (ID) numbers or values. The target ID may identify or address one or more client devices (such as the client devices 120 and 130 of FIG. 1). In accordance with aspects of the present disclosure, the target ID may be set to a value that identifies or addresses a single client device, that identifies or addresses a group of client devices, or that identifies or addresses all client devices capable of receiving the paging signal 205. If a paging receiver (such as the paging receiver 125 and/or 135 depicted in FIG. 1) determines that the encoded target ID identifies or addresses its associated client device, then the paging receiver may wake its associated client device, for example, so that its associated client device may respond to the paging signal.

In one embodiment, the target ID may be a device ID uniquely associated with (or assigned to) a particular client device, for example, so that the paging signal 205 may identify or address a single client device. The device ID may be stored, for example, in a memory associated with the client devices 120 and 130. In some aspects, the target ID may be a medium access control (MAC) address of the client device. In other aspects, the target ID may be an Internet Protocol (IP) address of the client device. In still other aspects, the target ID may be any other number or value that may be used to uniquely identify or address the client device.

In another embodiment, the target ID may be a group ID associated with a group of client devices (such as devices that share a common device class, a common family, and/or a common location), for example, so that the paging signal 205 may identify or address a group of client devices. In some aspects, the target ID may correspond to client devices that are in a common area or to client devices that perform a similar function.

In another embodiment, the target ID may be a broadcast ID that allows the paging signal 205 to identify or address all client devices within wireless range of the host device 110. In this manner, the host device 110 may cause all client devices within wireless range to transition from the low-power state to the active power state by broadcasting a single paging signal.

In some implementations, an on-off keying (OOK) modulation technique may be used to encode and transmit the paging signal 205. On-off keying uses the presence and absence of RF energy to encode and transmit data. In some aspects, the host device 110 may generate RF energy to indicate a first logical state (e.g., a logical one), and may not generate RF energy to indicate a second logical state (e.g., a logical zero). In other aspects, the host device 110 may generate RF energy to indicate a logical zero, and may not generate RF energy to indicate a logical one. During the transmission of RF energy associated with the paging signal 205, the host device 110 may not need to modulate the transmitted RF energy according to Wi-Fi, Bluetooth, BLE, or other communication protocols. Instead, the host device 110 may transmit an unmodulated carrier signal within a frequency or frequency band from which the paging receivers 125 and 135 of respective client devices 120 and 130 may detect a presence (or absence) of RF energy. Therefore, the paging receivers 125 and 135 provided within respective client devices 120 and 130 do not need to demodulate received RF signals, but rather may receive and decode the paging signal 205 by detecting a presence (or absence) of RF energy.

As an example, the host device 110 may generate and transmit RF energy via RF envelopes 210, 211, and 212. In some aspects, the paging receivers 125 and/or 135 may interpret the presence of RF envelopes 210, 211, and 212 as logical ones, and may interpret a lack of detected RF energy as logical zeros. In other aspects, the paging receivers 125 and/or 135 may interpret the presence of RF envelops 210, 211, and 212 as logical zeros, and may interpret a lack of RF energy as logical ones. In the example of FIG. 2, the RF envelopes 210, 211, and 212 may encode a target ID of 101101 (depicted as encoded target ID 250). In some embodiments, timing information for the encoded target ID 250 may be derived from the RF envelope 210.

In other implementations, the host device 110 may use other suitable modulation or coding techniques to provide the target ID in the paging signal 205. By way of example and not limitation, the target ID may be encoded using Manchester codes, Differential Manchester codes, Biphase codes, or any technically feasible codes. In some other implementations, the paging signal 205 may use a similar modulation as used for other communications by the host device 110; however, the paging signal 205 may be transmitted at higher power level (a power level greater than typical communication levels) to enable the a client device to operate in a low-power state. For example, a paging receivers 125 and/or 135 may operate in a low-power state, but when a paging signal 205 greater than a threshold power level is received, the paging receivers 125 and/or 135 can transition from a low-power state to an active power state.

In accordance with aspects of the present disclosure, the paging receivers 125 and 135 may be powered solely or substantially by the paging signal 205 transmitted from the host device 110. For example, the paging receivers 125 and 135 may include (or may be coupled to) one or more power harvesting circuits (not shown in FIGS. 1-2 for simplicity) that convert received RF energy into a current that, in turn, may be used to power the paging receivers 125 and 135. In this manner, the paging signal 205 may allow one or more portions of the client devices 120 and 130 to function without using battery resources. In some aspects, the paging signal 205 may include pre-charging RF energy pulses 220 and 221. Although only two pre-charging RF energy pulses 220 and 221 are shown in FIG. 2, in other embodiments, the paging signal 205 may include any number of pre-charging RF energy pulses.

The pre-charging RF energy pulses 220 and 221 may be used by the power harvesting circuits provided within the client devices 120 and 130 to provide power for one or more portions of the respective client devices 120 and 130. In some embodiments, the pre-charging RF energy pulses 220 and 221 may be transmitted at power levels greater than the RF envelopes 210, 211, and 212, for example, as depicted in FIG. 2. In other embodiments, the pre-charging RF energy pulses 220 and 221 may be transmitted at power levels less than the RF envelopes 210, 211, and 212.

In some embodiments, the pre-charging RF energy pulses 220 and 221 may be generated in a manner that does not enable detection by the paging receivers 125 and/or 135. For one example, the pre-charging RF energy pulses 220 and 221 may be too narrow to be detected. For another example, the pre-charging RF energy pulses 220 and 221 may be within an insensitive frequency band with respect to the paging receivers 125 and/or 135.

Figure 3:
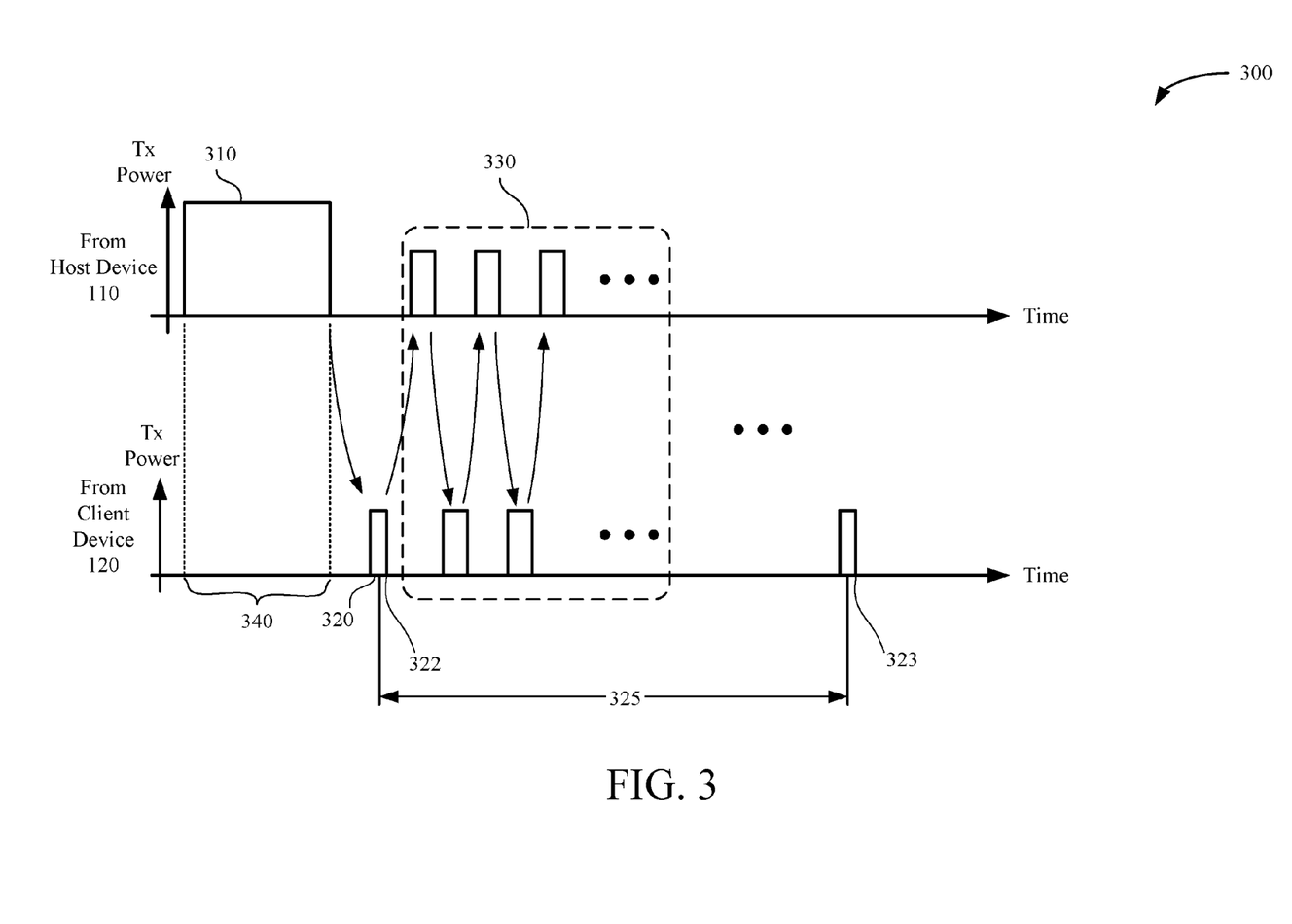
FIG. 3 is a diagram depicting an example radio-frequency (RF) signal exchange between a host device and a client device.

FIG. 3 is a diagram 300 depicting an example RF signal exchange between the host device 110 and the client device 120. Although the RF signal exchange is described with respect to the client device 120, any suitable client device capable of receiving and responding to a paging signal transmitted by the host device 110 may participate in the RF signal exchange. In some embodiments, the client device 120 may operate in the low-power state (to conserve power) until a paging signal 310 is received and determined to identify or address the client device 120. As depicted in FIG. 3, the host device 110 transmits the paging signal 310, for example, to cause the client device 120 to transition from a low-power state to an active power state. In some aspects, the paging signal 310 may be an embodiment of the paging signal 205 described above with respect to FIG. 2. Although not shown in FIG. 3 for simplicity, the paging signal 310 include a target ID that identifies or address the client device 120.

The client device 120 may receive and decode the paging signal 310 during a reception period 340. In response to receiving the paging signal 310, the client device 120 may transmit a confirmation message 320 to the host device 110. More specifically, the confirmation message 320 may be transmitted when the client device 120 determines (or verifies) that the target ID contained in the paging signal 310 identifies or addresses the client device 120. In some aspects, the confirmation message 320 may inform the host device 110 that the client device 120 has entered the active power state and is ready to begin exchanging data with the host device 110.

As described above with respect to FIG. 2, the client device 120 may include one or more wireless transceivers to communicate with other wireless devices. The one or more wireless transceivers may be used to transmit the confirmation message 320 using any technically feasible communication protocol. In some implementations, the confirmation message 320 may be an acknowledgement message transmitted to the host device 110 via a Bluetooth protocol, a BLE protocol, or any of the IEEE 802.11 protocols. In some aspects, the confirmation message 320 may be a BLE advertising packet. For the example of FIG. 3, the client device 120 transmits BLE advertising packets 322 and 323 to confirm receipt of the paging signal 310. The client device 120 may separate the transmission of the BLE advertising packets 322 and 323 by an advertising interval 325. Although only two BLE advertising packets 322 and 323 are shown in the example of FIG. 3, in other embodiments, the client device 120 may transmit any number of BLE advertising packets to the host device 110.

In some embodiments, the host device 110 may transmit the paging signal 310 in a first frequency band, and the client device 120 may transmit the confirmation message 320 in a second frequency band that is different than (such as non-overlapping) the first frequency band. In other embodiments, the paging signal 310 and the confirmation message 320 may be transmitted in the same frequency band or in overlapping frequency bands. Alternatively, or in addition, the paging signal 310 and the confirmation message 320 may be transmitted in different communication protocols. For example, the paging signal 310 may be transmitted according to a IEEE 802.11 protocol and the confirmation message 320 may be transmitted according to a Bluetooth protocol. Further, in some embodiments, the host device 110 may alternately transmit the paging signal 310 and listen for the confirmation message 320. In some aspects, the host device 110 may retransmit the paging signal 310 if the confirmation message 320 is not received from the client device 120 within a first timeout period. The retransmission of the paging signal 310 may be repeated a predetermined number of times or until a second timeout period expires.

After the host device 110 receives the confirmation message 320, then data may be exchanged between the host device 110 and the client device 120 during a communication period 330. Communications between the host device 110 and the client device 120 during the communication period 330 may be performed using any suitable communication protocol and/or using any suitable wireless channel or frequency band. During the communication period 330, any number of messages may be exchanged between the host device 110 and the client device 120. The signal exchange described herein (e.g., the paging signal 310, the confirmation message 320, and the communication period 330) may be repeated any number of times.

Figure 4:
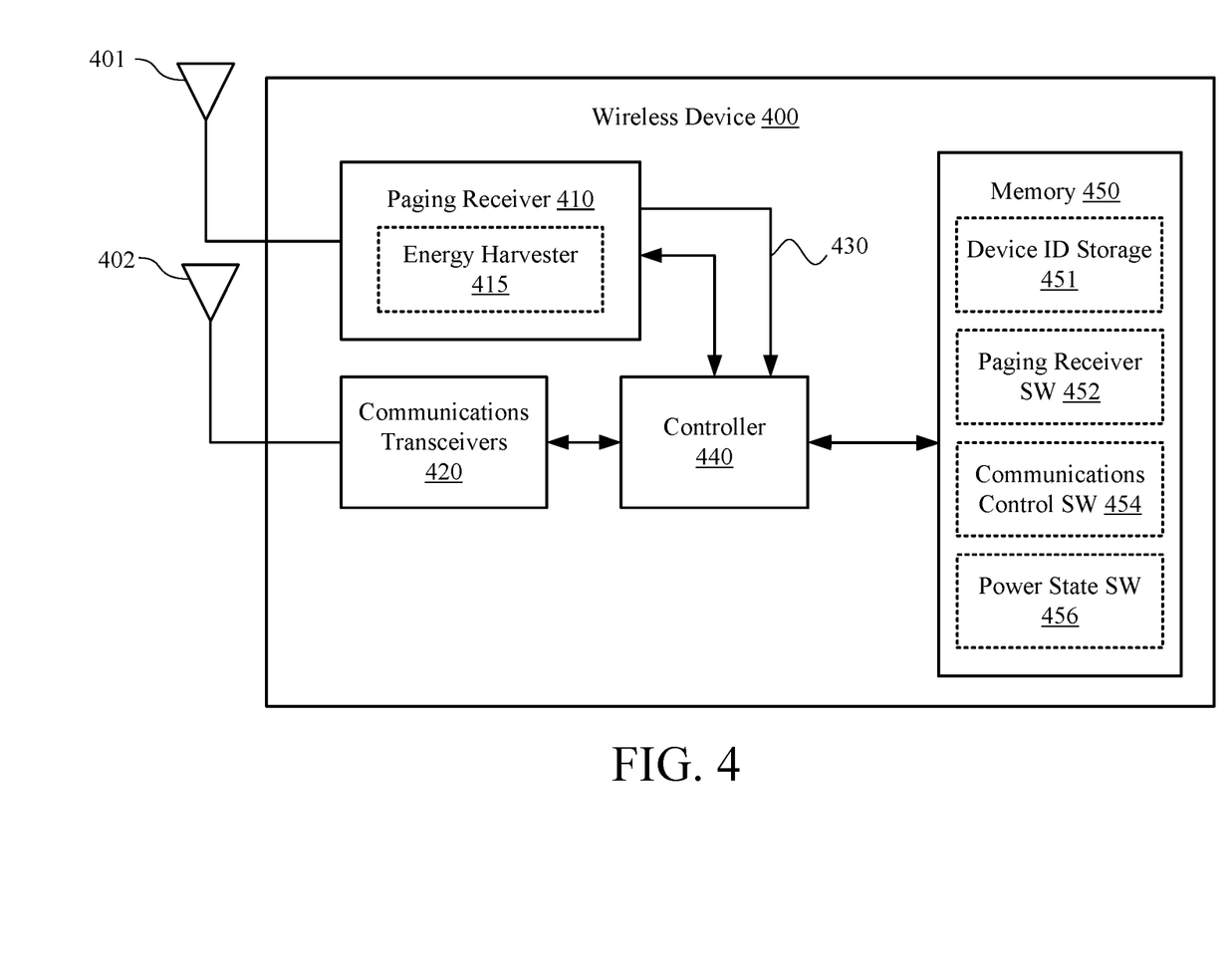
FIG. 4 is a block diagram of an example wireless device.

FIG. 4 is a block diagram of an example wireless device 400. The wireless device 400 may be an implementation of the client device 120 and/or the client device 130 of FIG. 1. The wireless device 400 may include first and second antennas 401 and 402, a paging receiver 410, one or more communication transceivers 420, a controller 440, and a memory 450. In one embodiment, the first antenna 401 is coupled to the paging receiver 410, and the second antenna 402 is coupled to the communication transceivers 420. In other embodiments, the paging receiver 410 and the communication transceivers 420 may be coupled to the antennas 401 and 402 through an antenna selection circuit (not shown for simplicity), for example, so that the paging receiver 410 and the communication transceivers 420 may share one or both of the antennas 401 and 402. Although the example wireless device 400 is shown to include only two antennas 401 and 402, in other implementations, the example wireless device 400 may include any suitable number of antennas.

The communication transceivers 420 may be used to transmit signals to and receive signals from other suitable wireless devices. Although not shown in FIG. 4 for simplicity, the communication transceivers 420 may include any number of transmit chains to process and transmit signals to other wireless devices via the antennas 401 and 402, and may include any number of receive chains to process signals received from the antennas 401 and 402. The communication transceivers 420 may be coupled to the controller 440.

The paging receiver 410, which may be coupled to the controller 440, may receive paging signals (such as the paging signal 310 described with respect to FIG. 3) transmitted from the host device 110. In some aspects, the wireless device 400 may operate in the low-power state until the paging receiver 410 receives a paging signal 310 containing a target ID that identifies or addresses the wireless device 400. When the wireless device 400 operates in the low-power state, one or more portions of the wireless device 400 may be powered down to reduce power consumption. For example, the communication transceivers 420, the controller 440, and/or the memory 450 may be powered down when the wireless device 400 operates in the low-power state. In addition, or in the alternative, one or more operations may be suspended when the wireless device 400 operates in the low-power state.

In response to receiving a paging signal 310 that identifies or addresses the wireless device 400, the paging receiver 410 may assert a wake signal 430 that causes the wireless device 400 to transition from the low-power state to the active power state. When the wireless device 400 operates in the active power state, the one or more portions of the wireless device 400 that were powered down during the low-power state may be powered up. For example, the asserted wake signal 430 may cause the controller 440 to transition from the low-power state to the active power state and signal other circuits, elements, and modules within or associated with the wireless device 400 to transition to the active power state. When the wake signal 430 is not asserted, then one or more portions (circuits, elements, modules, and the like) of the wireless device 400 may remain in the low-power state.

In some embodiments, the paging receiver 410 may include timing circuitry (not shown for simplicity) to determine when a previous paging signal 310 identifying or addressing the wireless device 400 was received. If a previous paging signal 310 identifying or addressing the wireless device 400 has not been received within a predetermined time period (such as determined by the timing circuitry), then the paging receiver 410 may assert the wake signal 430 and thereby cause the wireless device 400 to transition to the active power state, for example, so that the wireless device 400 can actively listen for any wireless transmissions from other wireless devices.

In some embodiments, the paging receiver 410 may include an energy harvester circuit 415. The energy harvester circuit 415 may receive RF signals through the antenna 401, and convert RF energy contained within or associated with the received RF signals into a voltage and/or current that, in turn, may be used to power one or more portions of the wireless device 400. In some aspects, the wireless device 400 may include a power storage device (not shown for simplicity) to accumulate power provided by the energy harvester circuit 415. For example, the wireless device 400 may include a capacitor, a super capacitor, or other suitable energy storage device to store power provided by the energy harvester circuit 415.

The memory 450 may include a device ID storage area 451 to store a device ID. As described above with respect the FIG. 2, the device ID may identify a specific wireless device (e.g., wireless device 400) and may be a MAC address, an IP address or any other number or value that may be associated with and/or used to identify or address the wireless device 400.

Further, the memory 450 may include a non-transitory computer-readable storage medium (such as one or more nonvolatile memory elements, such as EPROM, EEPROM, Flash memory, a hard drive, etc.) that may store the following software (SW) modules:

- a paging receiver SW module 452 to control operations of the paging receiver 410, for example, as described below for one or more operations of FIG. 5;
- a communications control SW module 454 to control wireless transmission and reception operations of the communication transceivers 420, for example, as described below for one or more operations of FIG. 5; and
- a power state SW module 456 to manage operation of the wireless device 400 in the low-power and active power states, and to control transitions of the wireless device 400 between the low-power and active power states, for example, as described below for one or more operations of FIG. 5.

In some implementations, one or more of the software modules may be executed as a user application program. Each software module includes program instructions that, when executed by the controller 440, may cause the wireless device 400 to perform the corresponding function(s). Thus, the non-transitory computer-readable storage medium of memory 450 may include instructions for performing all or a portion of the operations of FIG. 5.

The controller 440, which may be coupled to the paging receiver 410, the communications transceiver 420, and the memory 450, may be any one or more suitable controllers or processors capable of executing scripts or instructions of one or more software programs stored in the wireless device 400 (e.g., within the memory 450). In some embodiments, the controller 440 may be implemented with a hardware controller, a processor, a state machine or other circuits to provide the functionality of the controller 440 executing instructions stored in the memory 450.

The controller 440 may execute the paging receiver SW module 452 to control, at least in part, the paging receiver 410. For example, execution of the paging receiver SW module 452 may allow the paging receiver 410 to receive the paging signal 310, to determine a target ID from the paging signal 310, to determine whether the target ID identifies or addresses the wireless device 400, and to generate the wake signal 430.

The controller 440 may execute the communications control SW module 454 to transmit and receive data via the communication transceivers 420. In some embodiments, execution of the communications control SW module 454 may allow the wireless device 400 to transmit a confirmation message 320, to transmit BLE advertisement packets, and/or transmit and receive data to and from other wireless devices.

The controller 440 may execute the power state SW module 456 to manage power consumption of the wireless device 400. For example, execution of the power state SW module 456 may cause the wireless device 400 to operate in the low-power state or in the active power state based, at least in part, on a state of the wake signal 430 provided by the paging receiver 410.

Figure 5:
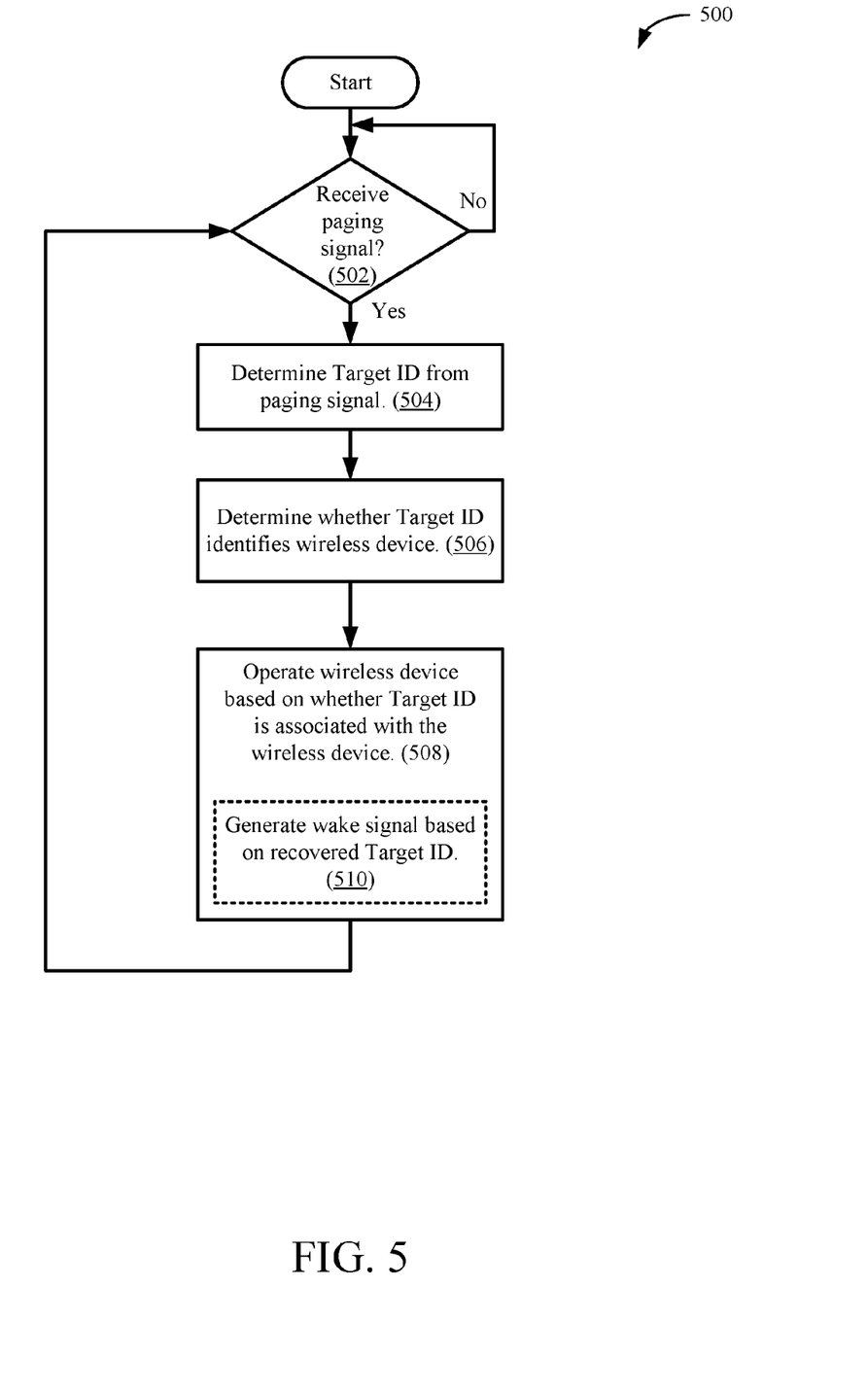
FIG. 5 is a flowchart depicting an example operation for operating a client device, in accordance with some embodiments.

FIG. 5 is a flowchart depicting an example operation 500 for operating a client device, in accordance with some embodiments. Although described herein as being performed by the wireless device 400 of FIG. 4, the operation 500 may be performed by the client devices 120 or 130 of FIG. 1, or any other suitable wireless device. The operation begins as the wireless device 400 waits to receive the paging signal 310 (502). In some embodiments, the paging signal 310 may be received by the paging receiver 410. The paging signal 310 may be an OOK coded RF signal including a target ID. If the wireless device 400 does not receive the paging signal 310, then the operation remains at 502.

If the paging signal 310 is received by the wireless device 400, then the wireless device 400 determines the target ID indicated in the paging signal (504). For example, the target ID may be encoded in the paging signal 310 by on-off keying, and the paging receiver 410 may determine the on-off keying encoded target ID from the paging signal 310.

Next, the wireless device 400 determines if the target ID identifies or addresses the wireless device 400 (506). For one example, the paging receiver 410 may determine whether the target ID matches a device ID associated with the wireless device 400 (e.g., the target ID is said to be verified). For another example, the paging receiver 410 may determine whether the target ID matches a group ID associated with the wireless device 400. In still another example, the paging receiver 410 may determine whether the target ID matches a broadcast ID associated with the wireless device 400.

Next, the wireless device 400 is operated based on whether the target ID identifies or addresses the wireless device 400 (508). For example, the wireless device 400 may be operating in the low-power state prior to receiving the paging signal 310. When the paging signal 310 is received and the target ID is verified, then the wireless device 400 may transition from the low-power state to the active power state in response to receiving the paging signal. In addition, or in the alternative, the wireless device 400 may transmit, to the host device, a message indicating that the paging signal 310 is received and the target ID is verified. In some aspects, the transmitted message may be an acknowledgement message and/or a single or periodic BLE advertisement packet. In other aspects, the transmitted message may be any other technically feasible communication signal to inform the host device that the wireless device 400 has entered the active power state and is ready to exchange data with the host device.

In some embodiments, the wireless device 400 may determine that a paging signal 310 identifying or addressing the wireless device 400 has not been received within a predetermined time period. In response thereto, the wireless device 400 may transition to the active power state, for example, to actively listen for any wireless communications that may be directed to the wireless device 400. In this manner, failure of the wireless device 400 to receive the paging signal 310 may not preclude the wireless device 400 from participating in data exchanges with the host device (or with other wireless devices).

In some embodiments, the wireless device 400 may perform an optional operation (denoted with dashed lines in FIG. 5) of generating a wake signal in response to receiving the paging signal and verifying the target ID (510). For example, the paging receiver 410 may assert (and/or drive to a positive logic state) the wake signal if the target ID is verified. Conversely, the paging receiver 410 may not assert (and/or drive to a negative logic state) the wake signal if the target ID is not verified. The wake signal may be used to control the state (low-power and/or active power state) of one or more sections, modules, and circuits of the wireless device 400. Next, operations return to 502.

In the foregoing specification, the example embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for operating a wireless device, comprising:
receiving, from a host device, a paging signal including a plurality of radio-frequency (RF) envelopes that include an encoded target identification (ID) value and one or more pre-charging pulses;
harvesting energy in the pre-charging pulses using an energy harvesting circuit;
powering at least part of the wireless device with the harvested energy;
determining whether the encoded target ID value included in the RF envelopes identifies the wireless device; and
based on a determination that the encoded target ID value identifies the wireless device:
transitioning the wireless device from a low-power state to an active power state; and
transmitting a message indicating that the wireless device has transitioned from the low-power state to the active power state.

2. The method of claim 1, further comprising:
maintaining the wireless device in the low-power state based on a determination that the encoded target ID value does not identify the wireless device.

3. The method of claim 1, further comprising:
transitioning the wireless device from the low-power state to the active power state based on a determination that no paging signals identifying the wireless device have been received for at least a predetermined time.

4. The method of claim 1, wherein the message is selected from the group consisting of a Bluetooth low energy advertisement packet, a target ID confirmation message, and an acknowledgement message.

5. The method of claim 1, wherein the paging signal is received in a first frequency band, and the message is transmitted in a second frequency band different than the first frequency band.

6. The method of claim 1, wherein the message is transmitted in accordance with a first communication protocol and the paging signal is received in accordance with a second communication protocol.

7. The method of claim 1, wherein the encoded target ID value is selected from the group consisting of a device ID assigned to a particular wireless device, a group ID assigned to a plurality of wireless devices, and a broadcast ID addressing all wireless devices within wireless range of the host device.

8. The method of claim 1, further comprising:
asserting a signal based, at least in part, on the encoded target ID value identifying the wireless device; and
powering-on a number of components of the wireless device based on assertion of the signal.

9. The method of claim 1, wherein the plurality of RF envelopes are transmitted using an on-off keying (OOK) encoding.

10. The method of claim 9, wherein the OOK encoding is modulated in a code selected from the group consisting of a Manchester code, a Differential Manchester code, and a Biphase code.

11. The method of claim 1, wherein transitioning the wireless device from the low-power state to the active power state is further based, at least in part, on whether a power level of the paging signal is greater than a threshold power level.

12. The method of claim 1, wherein the paging signal is received in accordance with a IEEE 802.11 protocol and the message is transmitted in accordance with a Bluetooth protocol.

13. The method of claim 1, wherein the encoded target ID value is encoded by a presence of RF energy representing a first logical state and an absence of RF energy representing a second logical state.

14. The method of claim 1, wherein the paging signal and the message are Bluetooth Low Energy signals.

15. A wireless device comprising:
an antenna;
a paging receiver coupled to the antenna and configured to:
receive a paging signal including a plurality of radio frequency (RF) envelopes that include an encoded target identification (ID) value and one or more pre-charging pulses;
harvest energy in the pre-charging pulses;
power at least part of the wireless device with the harvest energy; and
determine whether the encoded target ID value included in the RF envelopes identifies the wireless device;
a controller coupled to the paging receiver and configured to transition the wireless device from a low-power state to an active power state based on a determination that the encoded target ID value identifies the wireless device; and a transceiver coupled to the controller and configured to transmit, based on the determination that the encoded target ID value identifies the wireless device, a message indicating that the wireless device has transitioned from the low-power state to the active power state.

16. The wireless device of claim 15, wherein the controller is further configured to:

maintain the wireless device in the low-power state based on a determination that the encoded target ID value does not identify the wireless device.

17. The wireless device of claim 15, wherein the controller is further configured to transition the wireless device from the low-power state to the active power state in response to a determination that no paging signals identifying the wireless device has not been received for at least a predetermined time.

18. The wireless device of claim 15, wherein:

the paging receiver is configured to receive the paging signal in a first frequency band; and the transceiver is configured to transmit the message in a second frequency band different than the first frequency band.

19. The wireless device of claim 15, wherein:

the paging receiver is further configured to assert a signal based, at least in part, on the encoded target ID value identifying the wireless device; and the controller is further configured to power on a number of components of the wireless device based on assertion of the signal.

20. The wireless device of claim 15, wherein the plurality of RF envelopes are transmitted using an on-off keying (OOK) encoding.

21. The wireless device of claim 15, wherein the paging receiver is further configured to transition from a low-power state to an active power state based on a power level of the paging signal.

22. The wireless device of claim 15, wherein the message is a Bluetooth Low Energy advertising packet.

23. The wireless device of claim 15, wherein the encoded target ID value is encoded by a presence of RF energy representing a first logical state and an absence of RF energy representing a second logical state.

24. A non-transitory computer-readable storage medium storing instructions that, when executed by one or more processors of a wireless device, cause the wireless device to:

receive, from a host device, a paging signal including a plurality of radio-frequency (RF) envelopes that include an encoded target identification (ID) value and one or more pre-charging pulses;

harvest energy in the pre-charging pulses using an energy harvesting circuit;

power at least part of the wireless device with the harvested energy;

determine whether the encoded target ID value included in the RF envelopes identifies the wireless device; and based on a determination that the encoded target ID value identifies the wireless device:

transition the wireless device from a low-power state to an active power state; and transmit a message indicating that the wireless device has transitioned from the low-power state to the active power state.

25. The non-transitory computer-readable storage medium of claim 24, wherein execution of the instructions causes the wireless device to further:

maintain the wireless device in the low power state based on a determination that the encoded target ID value does not identify the wireless device.

26. The non-transitory computer-readable storage medium of claim 24, wherein execution of the instructions causes the wireless device to further:

transition the wireless device from the low-power state to the active power state based on a determination that no paging signals identifying the wireless device have been received for at least a predetermined time.

27. The non-transitory computer-readable storage medium of claim 24, wherein the message is selected from the group consisting of a Bluetooth low-energy advertisement packet, a target ID confirmation message, and an acknowledgement message.

28. The non-transitory computer-readable storage medium of claim 24, wherein the paging signal is received in a first frequency band, and the message is transmitted in a second frequency band, different than the first frequency band.

29. The non-transitory computer-readable storage medium of claim 24, wherein the message is transmitted in accordance with a first communication protocol and the paging signal is received in accordance with a second communication protocol.

30. The non-transitory computer-readable storage medium of claim 24, wherein the paging signal is received in accordance with a IEEE 802.11 protocol and the message is transmitted in accordance with a Bluetooth protocol.

* * * * *